INVENTOR.
THOMAS L. PETRUCCELLI

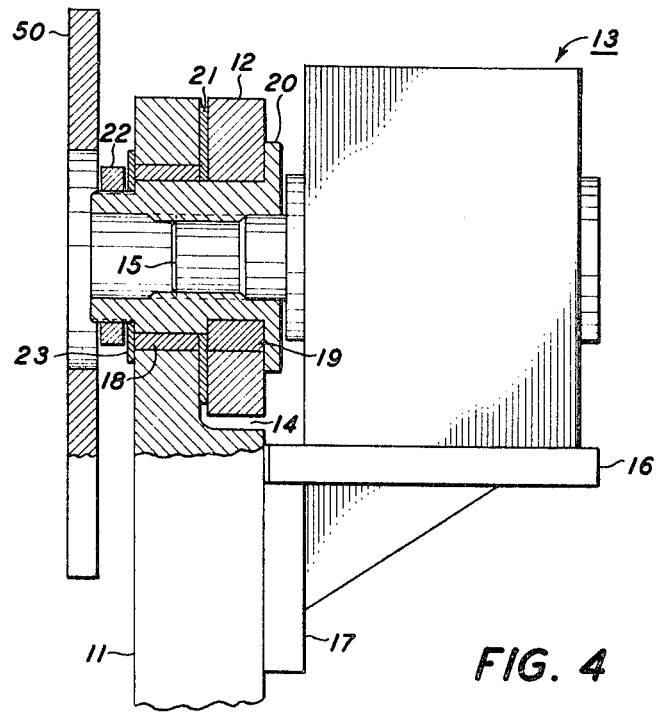
FIG. 4
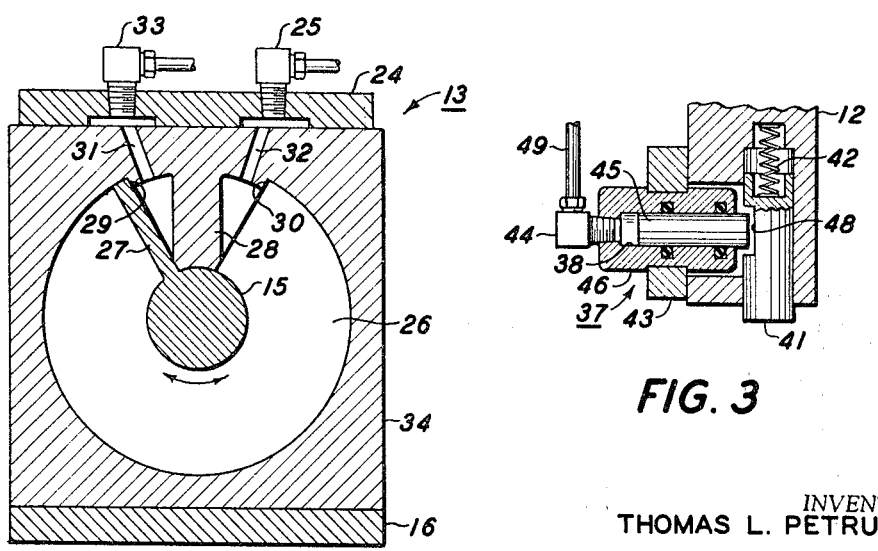
FIG. 3
FIG. 2

3,436,071
WORK HOLDER
Thomas L. Petruccelli, Webster, N.Y., assignor to Xerox Corporation, Rochester, N.Y., a corporation of New York
Filed Apr. 4, 1966, Ser. No. 540,070
Int. Cl. B25b 1/00, 1/24, 5/16
U.S. Cl. 269—20     12 Claims

ABSTRACT OF THE DISCLOSURE

Apparatus for supporting a thin walled or distortable work element in non-deformed posture against the forces generated by a machine tool.

---

This invention relates to apparatus for holding a work piece against the forces of a cutting tool during machining operations and, in particular, to holding a thin walled or distortable work piece in undistorted posture during machining operations.

Heretofore, it has been a problem to properly support a thin wall or distortable work piece against the forces generated by a machine tool. The forces that are exerted by a holding fixture are generally so high as to deform a thin walled or distortable work piece being supported therein during machining operations. When the work is released from the fixture it will return to its "free" or undistorted posture thereby negating the accuracy achieved by the machine tool. The main reasons a distortable work element cannot be properly supported during machine operations are: (a) a standard three and four jaw fixtures localized high holding forces in a small area on the work element thus causing the work to be deformed when held therein; (b) work elements, that is raw shapes, vary in dimensions so as to cause unequal holding forces to be exerted thereon when a contour-type holding device such as a saddle fixture is employed.

To properly machine a thin walled or distortable work piece it has heretofore been necessary to make multi-tool passes and often times requiring repositioning of the work in different fixtures in order to maintain the required machining accuracy. For example, in order to accurately bore a thin walled cylindrical work element, it was necessary to support the work first in a conventional fixture, without regard to distortion and, take a first rough cut. The work element was then released from the fixture and placed in a clamp which supported the piece on the flat or faced ends and then a second light finishing cut taken. As can be seen, in order to machine this work element to finished dimensions, two cutting passes and two set up operations had to be performed. This excessive use of machine time and setup time has proven very costly as well as being relatively slow for utilization in modern day production methods.

A cylindrical element as described above which is fabricated from extruded and drawn aluminum may have allowable deviations of diameter from the diameter which is specified that are as great as 0.020 of an inch. This means that at any point along the diameter of the cylinder the contour of the raw work element may be either oversized or undersized 0.020 inch and therefore a total out-of-round deviation of 0.040 inch may be had. Clearly a saddle type or contour fixture ground to the specified dimensions would not be able to support such a thin walled work element in a posture that is undistorted. The difference between the configuration of the out-of-round work element and the contour of the saddle fixture ground to specified dimensions would be such as to create unequal and therefore distorting holding forces.

Various methods have also been devised to overcome the problems found in machining distortable or thin walled work when such work is to be supported in a conventional holding fixture such as chucks and collets. A distortable work element can be held in a conventional fixture with forces below those which would distort the work element. However, since tool forces must equal holding forces, only very light cuts may be taken which necessitates, in most cases, more than one tool pass. For cuts of any considerable depth or length this method becomes time consuming and tedious and is wholly unacceptable in modern day mass production techniques. A method of "compensating errors" has also been devised and used with some limited success on cylindrical work elements. Here the work piece is repositioned in a conventional work holder after each cutting pass in an effort to minimize the inaccuracies of distortion created by the holding forces, that is, it is hoped that one error will offset another. Here again, this method necessitates multi-passes and increases the required machining time.

It is therefore an object of this invention to improve apparatus for supporting a thin wall or distortable work piece during machining operations.

A further object of this invention is to improve apparatus for supporting a thin walled or distortable work piece in an undistorted posture during machining operations.

A still further object of this invention is to improve apparatus for holding a thin walled or distortable work piece simply and accurately in undistorted posture during machining operations without special attachments or accessories.

Another object of this invention is to improve holding apparatus for supporting thin walled or distortable work pieces so that substantially equal holding forces are distributed over the cross section of such a work piece.

Another object of this invention is to improve automatic and semi-automatic holding devices so that thin walled or distortable work pieces can be held therein in undistorted posture.

These and other objects of this invention are attained by a work holder having cooperating members which are capable of sensing the contour of a work piece held therein. After sensing the contour of the work element, the holding or clamping feature of the work holder is adjusted to conform to the contour of an individual work element held therein. The cooperating members are then advanced to a position wherein substantially equal, and therefore non-deforming, holding forces are applied to the work piece.

For a better understanding of this invention as well as other objects and further features thereof reference is had to the following detailed description of the invention to be read in connection with the accompanying drawings, wherein:

FIG. 2 is a sectional view through the hydraulic drive unit of the holding fixture shown in FIG. 1 and taken along line 2—2 of FIG. 1;

FIG. 3 is a sectinoal view taken along line 3—3 in FIG. 1, showing the locking pin unit broken away from the holding fixture of FIG. 1;

FIG. 4 is a partial section view of the hinge unit of the holding fixture of FIG. 1 broken at the hinge section;

Figure 1:
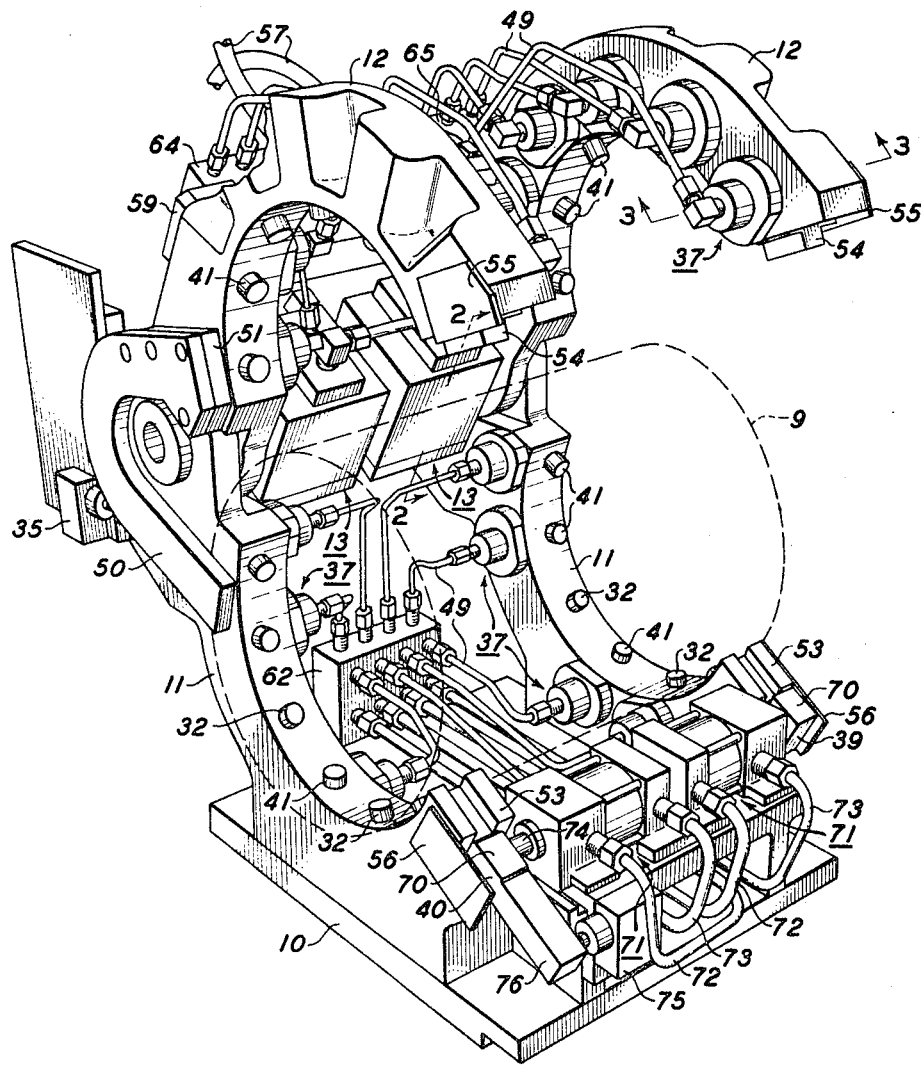
FIG. 1 is an isometric view of a holding fixture in an open position embodying the present invention.

The main embodiment of this invention, as depicted in FIG. 1, discloses a split jaw work holder having two separate pairs of cooperating jaw members, each pair consisting of a stationary jaw 11 about which is rotatably mounted movable jaw member 12. The two stationary jaw members are mounted in fixed relation to each other upon a base plate 10 which is adapted to ride along the ways of an automatic cutting machine such as a boring machine, automatic lathe or the like. A cylindrical work element 9 is shown positioned within open jaws in FIG. 1. Although the embodiment herein disclosed contemplates the use of a cylindrical work element, it should be noted that this type of holding fixture is well suited to support a work piece of any size or shape with equal adaptability by merely changing the shape and number of cooperating jaw members. The shape of the jaws are dictated by the shape of the work element to be held therein, while the number of jaw members are determined by the length of the element and the forces to be encountered during the machining operations. It should be further noted that a device of this nature is not limited to having a single movable jaw. Oftentimes an irregularly shaped element will necessitate utilization of a plurality of movable cooperating jaw members. For example, both jaws could be movable or one jaw stationary with two or more movable jaw members mounted upon it.

The forces required to both advance movable jaw 12 and to clamp a work element held therein are supplied by drive unit 13. Referring now to FIG. 2, drive unit 13 comprises a housing 34 in which a cavity 26 is formed. Shaft 15 is centered in the cavity, fitting snugly against embossed section 28. Vane 27 is permanently affixed to shaft 15 and runs the entire length of the cavity opening to divide the cavity into two separate chambers. Rotation of the shaft is obtained by introducing hydraulic fluid under pressure through intake-exhaust port 31 so that as fluid continues to be introduced into the chamber the shaft will be driven from stop 29 towards stop 30. Introduction of hydraulic fluid through opposing intake-exhaust port 32 will reverse the direction of shaft rotation. Fluid is supplied and returned from a reservoir (not shown) through connectors 33 and 25 mounted in cover plate 24. Drive units similar to the one herein described are sold commercially by Rotac Torque Actuator, Division of Ex-Cell-O Corporation, Detroit, Michigan, under the trade name "Rotac."

Drive shaft 15 extends through housing 34 of the hydraulic drive unit and is splined to hinge assembly 36. As shown in FIG. 4, hinge assembly 36 is free to rotate in bearing 18 mounted in stationary jaw member 11. The hinge assembly is held in intimate contact with movable jaw member 12 by means of pin 19 so that movement of the shaft will cause the movable jaw member 12 to be rotated. Because unit 13 is held in a fixed relation with stationary member 11 by means of support members 16 and 17, shaft rotation will cause the movable jaw member 12 to be pivoted about movable member 11. Stationary member 11 is provided with recess 14 in which movable jaw member 12 rotates, the two members being separated by a bearing plate 21. Sleeve 20 has a threaded end adapted to receive spanner nut 22 acting against washer 23 to hold the hinge assembly in place.

Referring once again to FIG. 1, the holding fixture, which is shown in the open position, is now ready to receive a cylindrical work element. Positive seating of the work element is assured by a three-point locating arrangement consisting of two sets of stationary locating pins 32 and longitudinal stop 50. A work piece is first seated on stationary pins 32 and then moved in a lateral direction until longitudinal stop 50 is encountered. Work pieces of different lengths can be accommodated by merely replacing spacer 51 with one of required length.

After a work piece is properly positioned within the holding fixture, the drive units advance the movable jaws towards a clamping position, however, before this position is reached the jaws are intercepted by wedges 39 and 40. With the jaw members being driven against the wedges in, what is herein referred to as, the sensing position, holding pins 41 are biased against the surface of a work element by means of springs 42 (FIG. 3). As shown in FIG. 1, a series of biased holding pins are located along the inner periphery of the cooperating jaw members; the pins being biased inwardly so as to describe the contour of a work element held therein. It should be obvious that such a holding fixture employed in a manufacturing process would be capable of sensing the shape of each successive work piece without special adjustment or accessories when the work pieces are within shop tolerances. It should be noted at this point that as the movable jaws are advanced to a sensing position, longitudinal stop 50 is moved back permitting a machine tool (not shown) to be moved into working contact with work element 9. It should be further noted that longitudinal stop 50 performs a second function of manually actuating limit switch 35 (FIG. 7), the function of which shall be later explained.

Figure 5:
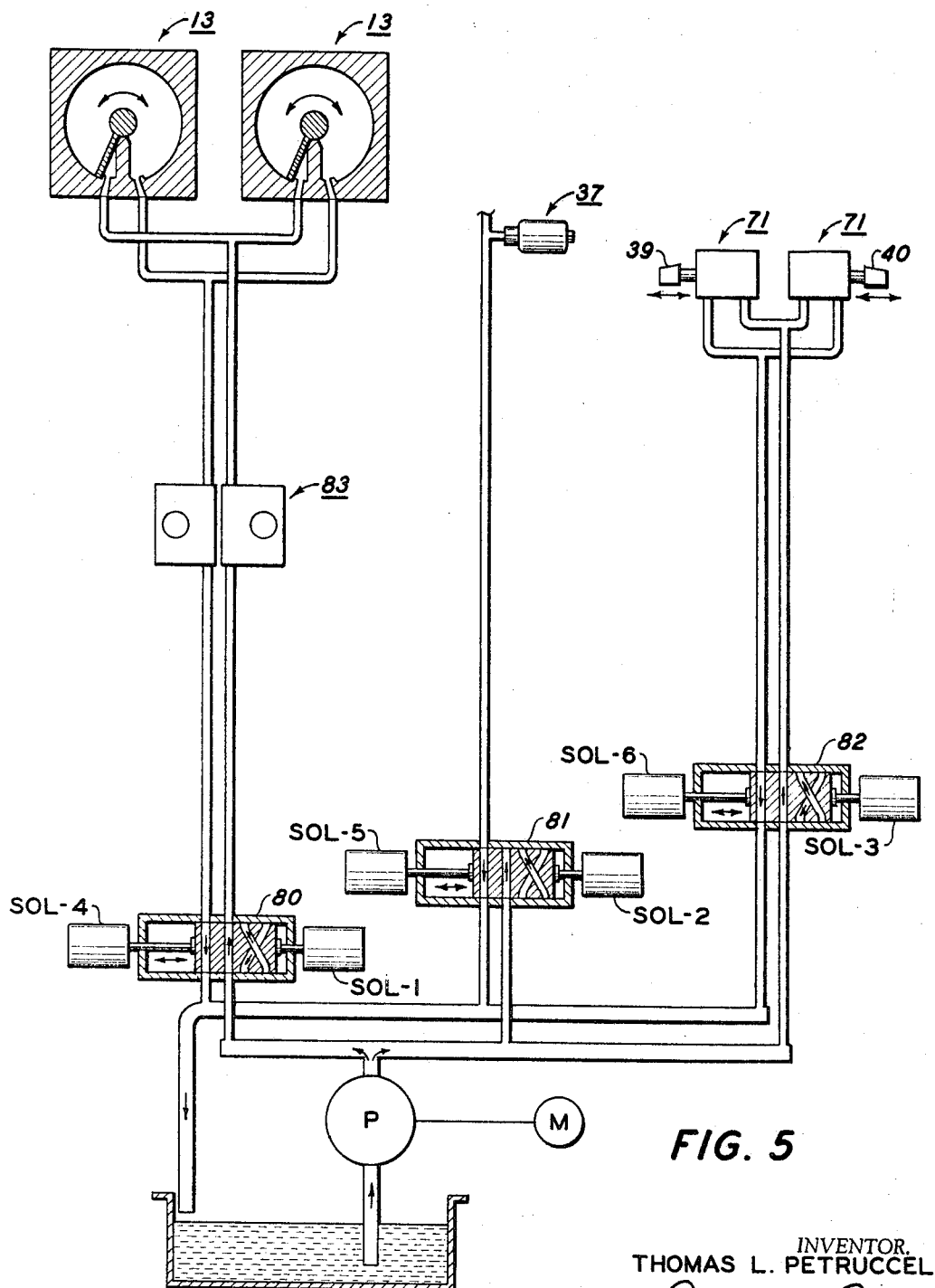
FIG. 5 is a schematic representation of the hydraulic system of the holding fixture shown in FIG. 1 with position shown in section to show internal operations.

As previously stated, the unbalancing of holding forces has proven to be the main reason why a distortable work piece will be held in a deformed posture during machining operations. In the present invention, application of substantially equal holding forces uniformly over a work element is made possible by locking the holding pins in a sensing position. Locking the pins in a position describing an individual work piece, that is, one in which the holding jaws and work elements have the same configuration, assures that the clamping forces delivered by the drive units will be equally and uniformly distributed over the work piece. For a better understanding of the locking operation, reference is had to FIGURE 3. Holding pin 41 has a flat bearing surface 48 machined upon it against which locking pin 45 acts. Locking pin 45, which is slidably mounted in bore 38, is driven into locking contact with the holding pin by hydraulic pressure supplied from the pump (FIG. 5). The fluid, which is supplied from the pump through hydraulic connection 44, acts directly on the back of holding pin 45. The locking pin, which sits snugly in bore 38, has a plurality of O-rings 47 mounted thereon to prevent leakage of hydraulic fluid around the pin. As can be seen, locking forces may be exerted upon the holding pin in this manner without these forces being transmitted directly to the work element. The locking pin assemblies 37, housed in housing 45, are permanently affixed to the cooperating jaw members by means of flange 43 (FIG. 1). Locking pins similar to the one herein described are sold commercially by the Wilton Tool Manufacturing Company, Schiller Park, Illinois, under the trade name "Wilton Rams."

A short time delay of approximately one second between wedge contact and pin locking is required to allow the fixture to reach an equilibrium condition after which time wedges 39 and 40 are removed to permit the movable jaws to further advance to a clamping position. Hydraulic cylinder 71, which has a double acting piston (not shown) draws tapered wedges 39 and 40 toward the cylinder in a lateral direction. As hydraulic fluid is introduced into the cylinder through lines 72, the double acting piston is forced to the opposite end of the cylinder transmitting the required movement to the wedges by means of rods 74. Tapered contact surface 70 of the wedges meets with a similar tapered wedge located in the movable jaws (not shown) to give maximum bearing surface when the jaws are held in a sensing position. Because the cooperating jaw members are at this time locked in actual physical contact with a work element, very little movement of the wedges in a lateral direction is required to place the cooperating jaw members in a clamping position. The holding pins, which are locked in contact with a work piece, are forced into a holding position so that substantially equal pressure is distributed around a work piece therein. To reposition the wedges so that they will again intercept the movable jaw on the next cycle, hydraulic fluid is simply introduced through lines 73 causing the double acting piston to return to the opposite end of cylinder 71. It should be noted that wedge 40 is provided with an arm 76 capable of actuating microswitch 75 when wedge 40 is moved back from the sensing position. Closing the microswitch signals that the automatic clamping operation is complete and that the work element is ready to be machined.

Hydraulic manifold systems are utilized throughout to supply the numerous locking assemblies 37 with hydraulic fluid. It is contemplated that this type of holding fixture will be used in automatic machine to deliver a stationary work piece to a moving cutter, although other work holding arrangements are feasible, and it is therefore desirous to hold to a minimum the number of flexible hydraulic connections which could foul in such a moving fixture. As shown in FIGURE 1, the lower or stationary jaws are serviced by a stationary manifold 62. Because the manifold and stationary jaw member are mounted in fixed relationship to each other, relatively rigid lines 49, which cannot foul in the moving mechanism, can be utilized to hydraulically supply the lower jaw locking assemblies. Referring once again to FIGURE 1, manifolds 64 and 65 are permanently affixed to the movable jaw members by means of support plate 59 so that the manifolds will move in a fixed relation with the jaws. This related motion between the movable jaws and the manifolds permits the upper locking assemblies 37 to again be hydraulically connected through relatively rigid lines 49. In the present embodiment, only two flexible connectors 57 (FIG. 1) are needed to service the movable manifold systems while one flexible connector (not shown) is needed to service the stationary lower manifold 62. This arrangement not only minimizes the danger of line fouling but also gives the holding fixture the greatest possible mobility.

Although a continually operating drive means is disclosed in this embodiment, such cannot be considered as a limiting feature of the present invention. It should be clear that an individual drive unit could be utilized to advance the cooperating jaw members from an open position, while a second drive means could similarly be utilized to further advance the cooperating jaw members from the sensing position to the clamping position.

*Operations*

Figure 6:
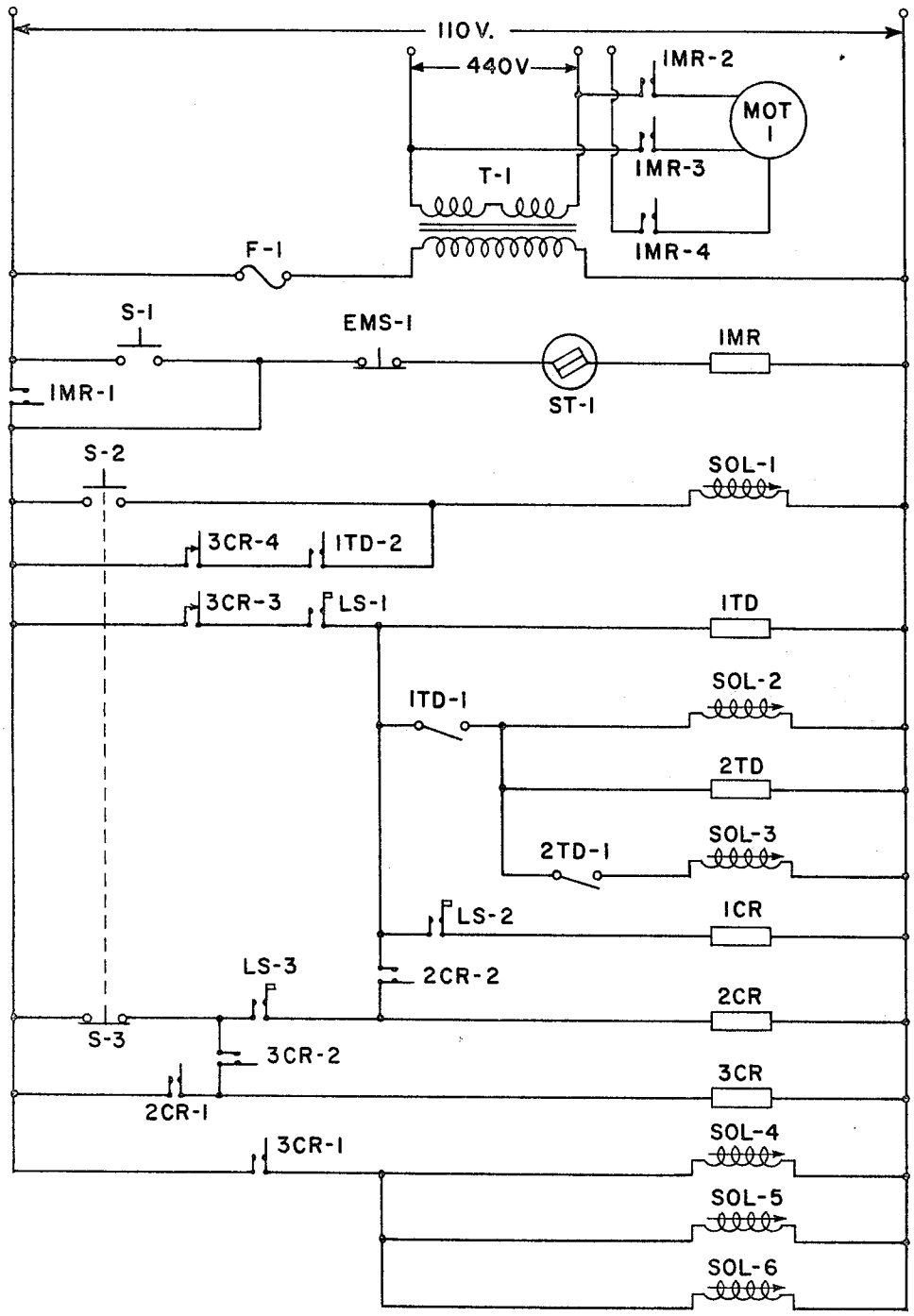
FIG. 6 is a schematic representation of the electrical system of the holding fixture shown in FIG. 1.

With the foregoing construction and arrangement of parts in mind, the operation of the holding fixture may be considered in further detail. The operation of this apparatus may be better explained with reference to the electrical diagram shown in FIGURE 6 read in conjunction with the schematic drawing of the hydraulic systems shown in FIGURE 5. Referring first to the electrical diagram, 440 volts are impressed across the primary side of transformer T-1 which allows current to flow through the secondary side of T-1 and also through fuse F-1. The operator, by manually depressing switch S-1, energizes relay 1MR. With relay 1MR energized, normally open switches 1MR-2, 1MR-3, and 1MR-4, found in the hydraulic pump circuit, are closed allowing current to reach the hydraulic pump motor. Pump switch S-1 is a single pole, spring loaded switch biased in the normally open position. A holding circuit is placed in the pump start circuit to bypass normally open switch S-1. With relay 1MR energized, switch 1MR-1 is closed establishing a bypass circuit electrically removing pump start switch S-1 from the circuit. Bypassing the normally opened pump start switch S-1 allows continuous operation of the hydraulic pump motor until such time as it is manually shut down. A switch EMS-1, located in the pump actuating circuit, enables the operator to shut down the pump manually when he so desires. Thermal sensing switch ST-1 is also placed in this circuit to detect any overload condition which might occur. The normally closed thermal switch opens the pump circuit when limits are exceeded.

With the hydraulic pump thus held in continuous operating condition, the work holding apparatus can now be prepared for automatic operations. The operator, after locating a work element within the jaws of the work holder, manually actuates cycle switch S-2 beginning automatic operations. Closing switch S-2 allows current to reach solenoid SOL-1. With SOL-1 energized, four-way valve 80 positioned in the drive unit hydraulic system is moved to the closed position. With valve 80 in the position shown in FIG. 5, hydraulic fluid is delivered under pressure to one side of the drive unit causing the shaft to rotate and advancing the movable jaws toward a closed position. As the movable jaws swing forward under hydraulic pressure, manually actuated limit switch LS-1 is tripped by longitudinal stop 50 (shown in FIGURE 1) allowing energizing current to reach relay 1TD. Relay 1TD performs a twofold function. First, an instantaneous electrical signal is sent to close switch 1TD-2 providing a holding circuit to energize solenoid SOL-1 bypassing normally open cycle switch S-2. Second, relay 1TD also has a time delay function which will delay closing switch 1TD-1 until the movable jaws have seated themselves upon the wedges. It has been found that a time delay is required so that the holding fixture can reach an equilibrium condition after the movable jaws have been seated upon wedges 39 and 40 in the sensing position. A time delay of less than one second is generally sufficient to reach this equilibrium condition. With solenoid SOL-1 held energized, four-way valve 80, located in the drive unit system, remains positioned so that the movable jaws are continued to be driven forward. A pressure adjusting valve 83 is placed between the hydraulic pump and the drive units which allows the operator to accurately adjust the pressure exerted by the cooperating jaw members.

With the holding fixture in the sensing position, the spring biased holding pins will be able to sense or feel the shape of the work piece held therein. A time delay in previously mentioned relay 1TD closes switch 1TD-1 thereby actuating solenoid SOL-2, located in the holding pin hydraulic circuit, as shown in FIGURE 5. Energizing solenoid SOL-2 causes four-way valve 81 to move to the locking position forcing locking pin 45 against holding pin 41. Construction of this locking pin assembly is shown in FIG. 4. Closing of switch 1TD-1 has also energized a second time delay relay 2TD which assures that all holding pins are locked in the sensing position before the movable jaws are advanced from the sensing position to the clamping position. At the end of the required time period, relay 2TD closes switch 2TD-1 to energize solenoid SOL-3. With solenoid SOL-3 energized, four-way valve 82 in the wedge release hydraulic system is moved to the release position shown in FIG. 5. At this time the movable jaws are still being driven forward against wedges 39 and 40 by the continually acting drive units. Hydraulic fluid under pressure is applied to the release side of cylinder 70 which, in turn, physically moves the wedges out of the supporting position. As the wedges are moved back the movable jaws of the holding device advance from the sensing position to a clamping position. Substantially equal pressure is applied around the outer periphery of the work element held therein. Wedge 40, which is provided with a special arm 76, physically closes normally open limit switch LS-2. Referring once again to the electrical diagram shown in FIGURE 5, it can be seen that closing limit switch LS-2 allows current to reach relay 1CR. Relay 1CR sends an electrical signal to the automatic machine informing it that the work element is now securely held in place and ready to be operated upon at which point the automatic machine will take over and perform the desired machining operations. Limit switch LS-3 is preset to close when the automatic machine has completed its cycle of operations and the work element is in condition to be released from the holding fixture.

Switch S-3 is normally biased in the closed position allowing current to reach limit switch LS-3. Limit switch LS-3 is located between the last machining station and the neutral or element loading station. The switch is closed as the fixture moves from this last machining operation to the element loading station to energize relay 2CR for a short period of time. To hold 2CR energized through the release cycle, a holding circuit is established through limit switch LS-1 and switch 2CR-2. Closing limit switch LS-3 energizes relay 2CR pulling switch 2CR-2 to a closed position to complete this holding circuit. Current will continue to energize 2CR until such time as the movable jaws move toward a release position opening manually operated limit switch LS-1. Energizing of relay 2CR also sends a message to the automatic machine informing it that the machining cycle is complete and pulls switch 2CR-1 closed allowing current to reach relay 3CR.

With relays 3CR energized, normally closed switches 3CR-4 and 3CR-3 are opened to de-energize solenoids SOL-1, SOL-2 and SOL-3. At the same time relay 3CR also closes normally open switch 3CR-1 to energize solenoids SOL-4, SOL-5 and SOL-6 causing four-way valves 80, 81 and 82 to move to their respective open positions. Referring once again to FIGURE 5, opening four-way valve 80 in the hydraulic system reverses the direction of shaft rotation causing the movable jaws to be driven toward an open position. Opening four-way valve 81, located in the locking pin hydraulic system, releases the locking pins allowing the spring biased holding pins to return to a sensing condition. At the same time, the energizing of solenoid SOL-6 places four-way valve 82 in position to reverse the flow of hydraulic fluid to cylinders 70. Reversing the hydraulic fluid will cause the two-way piston located in the cylinders to move wedges 39 and 40 into position to interrupt the movable jaws again in the next clamping cycle. Energizing of relay 3CR also causes normally open switch 3CR-2 to be closed allowing 3CR to remain energized until such time as switch S-3 is opened. Switch S-3, which is physically locked to cycle switch S-2, is biased in the closed position. Manual operation of cycle switch S-2 by the operator causes switch S-3 to open de-energizing relay 3CR. With relay 3CR out of the circuit, solenoids SOL-4, SOL-5 and SOL-6 are also de-energized so that a new cycle can be started.

While the invention has been described with reference to the structure disclosed herein, it is not confined to the details set forth, and this application is intended to cover such modifications or changes as may come within the purpose of the improvements and the scope of the following claims.

What is claimed is:

1. A work holding apparatus to support a work piece against the action of a machine tool including
    cooperating members being adapted to retain a work piece therebetween,
    drive means operable to advance the cooperating members towards a first sensing position and a second clamping position,
    sensing means positioned in said cooperating members being adapted to deliver a uniform holding pressure about the entire periphery of the work piece when the members are advanced from the sensing position to the holding position, and
    means to lock said sensing means in a sensing condition when the cooperating members are in a first sensing position.

2. A work holding apparatus for supporting a work piece during machine operations comprising
    cooperating members being adapted to retain a work piece therein,
    a plurality of sensing pins mounted in said cooperating members being adapted to deliver uniform holding pressure about the entire periphery of the work piece when the piece is supported in the work holding apparatus,
    driving means operable to advance the cooperating members towards a first sensing position and a second clamping position,
    blocking means operative against the action of said driving means to interrupt the advancement of said cooperating members in a sensing position wherein said sensing pins are seated against the work piece,
    means to lock the sensing pins seated around the periphery of a work piece while it is being supported in said sensing position,
    means operable to remove said blocking means from acting against the action of said driving means to produce further advancement of said cooperating members from the said sensing position to said clamping position.

3. The apparatus described in claim 2 wherein the cooperating members comprise a stationary member acting in cooperation with one or more movable members.

4. The apparatus described in claim 2 wherein the cooperating members comprises a stationary member acting in cooperation with a movable member.

5. The apparatus described in claim 2 wherein the sensing pins are slidably mounted in said cooperating members and urged into contact with a work element by biasing means.

6. The apparatus described in claim 2 wherein the interrupting means comprises a tapered wedge capable of supporting said cooperating members in a sensing position.

7. The apparatus described in claim 6 wherein the means operable to produce further advancement of said cooperating members is a hydraulically actuated release cylinder adapted to remove said tapered wedge from the first interrupting position to a second release position wherein said cooperating members are free to advance to said clamping position.

8. A work holding apparatus for supporting a work piece during machining operations comprising
    cooperating members comprising a first stationary member about which is rotatably mounted a second movable member,
    means operable for advancing the movable member through a series of positions,
    said positions comprising a loading position, a sensing position and a clamping position,
    a plurality of spring biased holding pins slidably mounted along the periphery of the cooperating members,
    said pins capable of being urged in a radial direction so as to contact a work element when the cooperating members are in the sensing position,
    locking pins capable of being driven into contact with said holding pins so as to lock said holding pins in a position against a work piece when the cooperating members are in said sensing position,
    means to interrupt the advancement of said cooperating members in said sensing position,
    means operable to produce further advancement of the cooperating members from a sensing position to a clamping position.

9. The apparatus described in claim 8 having further control means to regulate the clamping force delivered by said advancing means.

10. The apparatus described in claim 9 wherein the cooperating members advance toward each other so as to clamp a work piece on the external surface of said work piece.

11. A work holding fixture of the split jaw type adapted to hold a thin walled distortable work piece in an undistorted position during a machining operation including
    a stationary jaw and a movable jaw positioned to cooperate to hold a work piece in a position to be machined,
    the movable jaw being adapted for movement between a work loading position wherein a work piece may be positioned between the jaws, a sensing position wherein the contour of a workpiece is sensed and a clamping position wherein a work piece is rigidly held against the force of a machine operation, a plurality of holding pins mounted around the inner surface of the stationary jaw and the movable jaw and slidably movable into and out of the jaws, the holding pins being spring biased to contact a work piece when the jaws are in the sensing position thereby conforming to the contour of the work piece, means to lock the holding pins relative to the jaws in the position conforming to the contour of the work piece, said locking means consisting of a plurality of locking pins driven into contact with the holding pins to prevent movement of the holding pins after the holding pins have contacted the work piece, and drive means to move the movable jaw between the loading position, the sensing position and the clamping position to thereby secure a work piece with the holding pins.

12. A work holding apparatus for supporting a thin walled cylindrical element during machine operations comprising:

cooperating members being adapted to retain the work element therein, driving means operable to advance the cooperating members towards a first sensing position and a second clamping position, a plurality of sensing pins positioned in said cooperating members and being adapted to deliver uniform holding pressure about the entire periphery of the work element when the cooperating members are advanced from the sensing position to the clamping position, blocking means operative against the action of said driving means to interrupt the advancement of said cooperating members in a sensing position wherein said sensing pins are seated against the work element, means to lock the sensing pins about the periphery of the work element while the work element is being supported in the sensing position.

means operable to remove said blocking means from acting against the action of said drivnig means to produce further advancement of said cooperating members from the sensing position to the clamping position.

References Cited
UNITED STATES PATENTS

| | | | |
|---|---|---|---|
| 599,562 | 2/1898 | Hurlbut | 279—110 |
| 1,482,162 | 1/1924 | Streda | 29—272 |
| 2,486,494 | 11/1949 | Rice | 269—266 |

LESTER M. SWINGLE, *Primary Examiner.*

D. R. MELTON, *Assistant Examiner.*

U.S. Cl. X.R.

269—266